Aug. 13, 1946.    O. A. KNOPP    2,405,657
POWER SURVEY INSTRUMENT
Filed July 10, 1940    3 Sheets-Sheet 1

OTTO A. KNOPP
INVENTOR.
BY *Ernie L. Johnson*
ATTORNEY

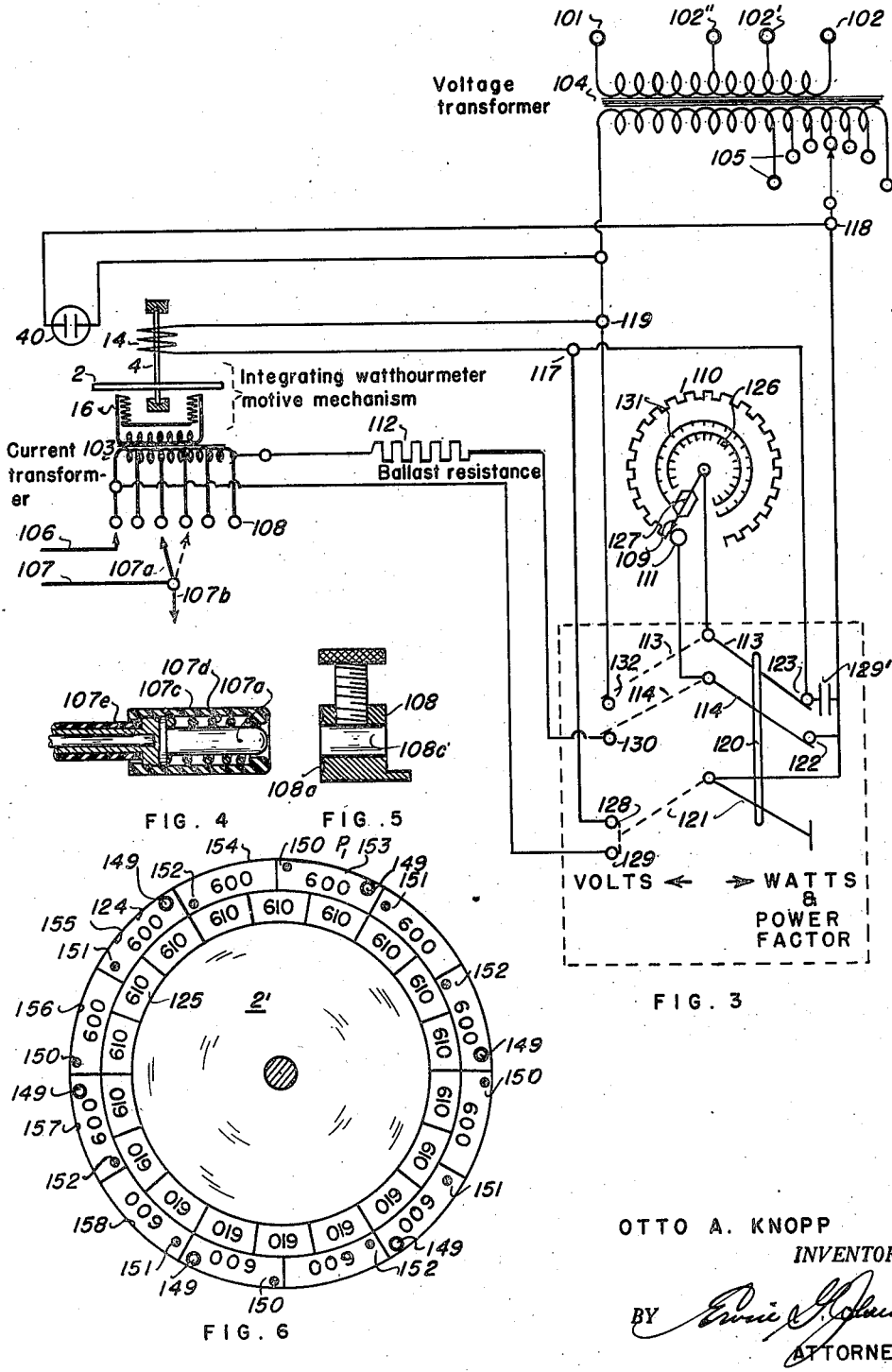

OTTO A. KNOPP
INVENTOR.

Patented Aug. 13, 1946

2,405,657

UNITED STATES PATENT OFFICE 2,405,657

POWER SURVEY INSTRUMENT

Otto A. Knopp, Oakland, Calif.

Application July 10, 1940, Serial No. 344,665

29 Claims. (Cl. 171—34)

This invention relates to power survey instruments and methods of conducting power surveys, and is an improvement over that disclosed in my copending application Serial Number 324,119, filed March 15, 1940.

One of the objects of this invention is to extend the usefulness of the invention to include the provision of voltage measurement in addition to the measurement of wattage and power factor.

Other objects include: provision for increased precision in the determination of power and power factor; provision for varying the range of power measurement by the instrument without interruption of the consumer's current supply; and provision for reading values of electrical quantities directly from the rotating portion of the meter.

Further objects include the improvements in methods and in apparatus for ascertaining which of a possible multiplicity of possible values of a measured quantity is actually operative to produce an appearance of standing still in a stroboscopic apparatus.

Additional objects include the provision for simplified indication and recording of power factor in a single phase circuit.

Still further objects and advantages will appear to those skilled in the art upon consideration of the following specification wherein reference is made to the drawings, in which:

Fig. 3 is a diagram for an instrument to measure power, power factor, and voltage;

Fig. 4 is a section of a current connector plug;

Fig. 5 is a sectional elevation of a connector plug socket;

Fig. 6 is a plan of a modified indicating rotor;

Figure 1:
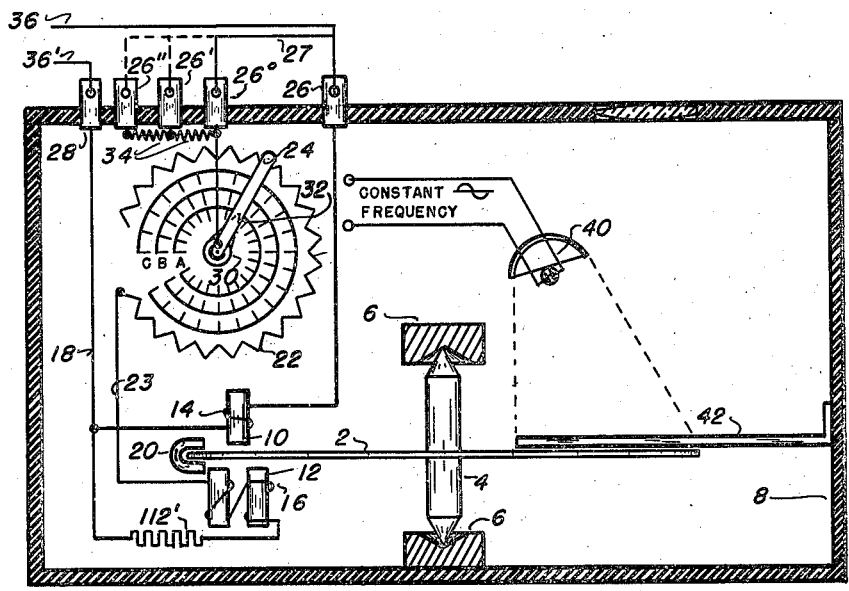
Fig. 1 is a schematic illustration for a voltmeter.

The instrument comprises elements corresponding to or identical with the motive elements of the customary induction type alternating current watthourmeter; having a rotor disc 2 secured for rotation on a spindle 4 suitably pivoted in bearings 6 fastened to a case 8, fixed electromagnets 10 and 12 having windings 14 and 16 to receive alternating current from the terminals 26 and 28, and a permanent magnet 20 in braking relation to rotor 2.

In order to effect rotation of the disc 2, the flux due to current in winding 14, corresponding to the shunt or voltage winding of a watthourmeter motor, lags behind the flux due to the current in series winding 16, and operates according to the principle of a split-phase induction motor. It is preferable to arrange for maximum torque on the rotor at unity power factor loads for any current in the wires 36, 36', as by causing the flux due to current in 14 to lag ninety degrees behind that of the current in winding 16 at unity power factor in the usual manner.

When the windings are connected as indicated in Fig. 1, the torque on rotor 2 is proportional to the product of the currents in the two windings 14 and 16, which is, in turn, proportional to the second power of the voltage applied to the terminals 26 and 28. With any certain voltage applied to terminals 26 and 28, resistance 22 being of a certain value, the rotor 2 will move at an angular speed indicative of the voltage applied. Conversely, when the rotor 2 moves at that certain angular speed and the resistance 22 is of that same certain value, it is known that such certain voltage is being applied to terminals 26 and 28.

In order to measure voltage, the disc 2 is caused to rotate at a fixed predetermined angular speed by means of the manually variable resistance 22 which is connected in series with the current winding 16 only. A fixed ballast resistance 112' is also included in the circuit to insure a maximum current flow. The resistance 22 is varied by a manually operated conductor arm and contactor 24.

The actuator shaft 30 for contactor 24 is provided with an indicator 32 for cooperation with a selected one of the scales A, B, C, in accordance with the range of voltages being measured. Multiplying resistances 34 may be inserted in series with the resistance 22 and the current winding 16 by changing the connection 27 to instrument terminals 26' or 26".

In order to make a voltage measurement, connections are made to the source of voltage as 36, 36'. Contactor 24 is adjusted until the disc 2 comes to a certain angular speed of rotation corresponding to that for which one of the scales A, B, or C has been calibrated, and for which the correct value of voltage is indicated by the pointer 32 in registry with the correspondingly identified scale A, B, or C of resistance 22.

In order to determine when the rotor 2 rotates at that certain fixed angular speed, stroboscopic means such as described in the copending application are employed. On the rotor 2 there are provided rings 38a, 38b, etc., identified with the scales A, B, and C of the variable resistance 22. At a definite speed of the rotor 2, ring 38a appears to stand still when viewed with the light from glow lamp 40, the current for which is interrupted at a fixed frequency.

If, in adjusting of the slider 24, ring 38a appears to come to a stop, then the correct value of voltage will be read on scale A of the resistor 22, opposite pointer 32. Ring 38a is identified on fixed arm 42 mounted on the instrument case 8. If, however, in the adjustment of the slider 24, one of the rings 38b, or 38c appears to come to a stop, then the correspondingly identified scale, B or C, is used to read the voltage opposite pointer 32.

The lamp 40 may be connected to terminals 26 and 28, if the lamp is of the glow type and if the line frequency is reliably constant.

The appearance of non-movement of a ring at a certain speed of rotation is due to the fact that while the lamp at 40 is not illuminating, any particular point on the ring is replaced in position by another point on that ring having identical appearance. Accordingly, each ring is made up of a plurality of equally spaced marks of identical size and appearance. The angular spacing of the individual identical marks of a ring 38 is determined by the fixed angular velocity, which is, in turn, determined in accordance with the voltage selected as the basis upon which to calibrate the resistance 22.

In calibration, the slider 24 is placed near the midpoint of resistance 22, and the exact speed of the rotor is measured, as, by counting the passages of a spot on the rotor for a period of time. Having determined the angular velocity of the rotor for that voltage, the scale A may be marked with the known value of voltage 36—36', as measured by some standard instrument.

The ring 38a is marked out as the result of a calculation based upon the frequency that the lamp 40 is illuminated and the speed of the rotor. For example, if the disc rotates 60 times per minute or once per second, and the lamp 40 is illuminated 60 times per second, a point on the disc will move through one-sixtieth of a revolution during each illuminating cycle. Accordingly, in order that a ring shall appear to stand still at this speed, it must be composed of identical marks extending through six degrees of arc. Having marked the ring 38a, for example, and the resistor scale A, the voltage is increased at 36—36' by the desired scalar increment. Contactor 24 is then adjusted until ring 38a again appears to stand still, and the scale A is marked for the new value of voltage. The calibration for the entire scale is carried forward in this manner.

Other voltage ranges are employed to increase and decrease the range of potentials measurable at 36—36', the divisions on scales A, B, and C being greater or less in accordance with the range of voltages measured.

The principle of the foregoing description, and the teachings of the copending application referred to, are employed in connection with additional features to extend the usefulness of either of the previously described apparatus to the other, so that one instrument can do the work of both. In addition, certain refinements provide for great precision and facility in the observations so that the inspection of consumer-load conditions may be accomplished with the greatest possible dispatch.

It has been shown that the rotor of an induction watthourmeter, or its equivalent, may be modified to indicate voltage; and that it may be modified to indicate watts and power factor. Among other things, the modification of Fig. 3 measures all these values.

To this end, and with the desire to reduce the amount of weight of involved mechanism to a minimum, and, as well, to permit great precision for measurements, a single resistance is provided and is usable, upon selection of proper circuits, to obtain readings of either voltage or power factor.

The circuits for the electrical instrument receive voltage of the load at input terminals 101 and 102 of a variable ratio instrument voltage transformer 104 provided with fine-adjustment secondary taps 105; and current at two terminals of the variable ratio instrument current transformer 103 from load current input conductors 106 and 107. In order to avoid repeated load current interruptions, conductor 107 has two terminals 107a and 107b, so that one, 107b, for example, can be inserted in the desired terminal 108 before the other, 107a, is withdrawn. Accordingly, since 106 is always connected when making current or wattage measurements, the current circuit is not interrupted when the current-transformer ratio is changed.

Terminals 107a, and 107b, are preferably insulated by insulating sleeves 107c to prevent possible grounds and short circuits, the sleeves 107c being projected by springs 107d, collapsed against annular terminal recess 108a incident to forcing shank 107e toward the socket.

The voltage input is stepped through variable-ratio voltage transformer 104, the ratio for which is manually variable by the tap connections at 105, the percentage change in ratio for each tap being of the order of that required to divide the least reading on the watt scales into equal fractions such as tenths.

The output of transformer 104 is applied to one circuit; including the voltage winding 14, the resistance contact arm 109 corresponding to arm 32 of Figure 1, and a portion of the resistance 110 or the stationary contact 111, or both. Concurrently, the current leads 106, 107 are connected to the current transformer 103.

The arrangement of connections can be changed so that the output of the voltage transformer 104 is applied to energize both the voltage coil 14 of the rotor, and the current coil 16, through the instrument current transformer 103 and the variable resistance 110, the current leads 106 and 107 being disconnected. With this arrangement the speed of the indicator rotor becomes proportional to the square of the voltage, and the various stroboscopic arcs on the rotor have significance as indicating voltage instead of watts when their appearance of standing still is correlated with the voltage applied. The primary coil of the instrument transformer 103 is safeguarded, irrespective of the position of contact 109, by a ballast resistance 112. It is to be noted that the resistance 110, in this arrangement, is only in the supply circuit of the primary winding of current transformer 103.

The resistance 110 is electively included into the potential circuit by actuating switch arms 113, 114, forming the terminals of the variable resistance 110, into contact with stationary switch contacts 123, 122, connected, respectively, to one terminal 117 of the potential coil 14 and the terminal 118 of the secondary of input voltage transformer 104. This arrangement is illustrated in full lines in Fig. 3, wherein the arms 113 and 114 are indicated as actuable by a common operator 120. In this position of the switch blades 113, 114, the potential winding 14 is connected for the measurement of watts and power factor. The load current conductors 106 and 107 are connected to the current transformer 103 to supply current to the current coil 16. The circuit including resistance 112, is opened, as here illustrated, at two points, by switch contactors 114 and 121, both connected for actuation by operator 120.

For measuring power, the full line position of the switches 113, 114, being occupied, the potential winding circuit is traced from one terminal 118 of the input or load voltage transformer 104 to switch terminal 122, blade 114, the terminal 111 constituting the point of contact of contact 109 for measurement of watts, through contact arm 109 to blade 113, stationary switch contact 123, thence to terminal 117, through winding 14 to the other output terminal 119 of the voltage transformer 104. Accordingly, the potential on winding 14 is, for the purposes of measuring power, connected for receiving the full effect of the stepped down load voltage. Current proportional to load current is supplied to current coil 16 by transformation from conductors 106, 107.

The effect on the rotor 2 of the watt measuring connections just described, is rotation at a speed which is a function of the product of current and the in-phase component of voltage, as explained in my copending application above identified. The speed of the rotor 2 is directly indicated by stroboscopic means as described previously, and if desired, the various rings may be marked with identical numbers, as shown in Figure 6, arcuately equally spaced in such manner that the appropriate numeral to the power value is readable when that value of power is applied.

PRECISION FEATURES

It is evident that the value of power being measured at any time is likely to lie between the values of which two rings, 124, 125, for example, would give indication; but not medianly between their indicative values, so that the exact value would be difficult to estimate with accuracy. In order to obtain precise indications of intermediate values of the power to which the disc 2 is responding, one of the rings is brought to apparently stationary state through changing the number of turns on the output of transformer 104, by a fixed fractional percentage of normal, as by ½% of normal for each step from the center tap 105. Therefore, if the number of output turns of transformer 105 is increased by the tap changer in order to obtain the apparently stationary state of the disc 2, the wattage indicated by the apparently stationary ring is in excess of the actual wattage by the percentage of the increase of such output turns, and the subtractive correction is applied by the operator. Each tap 105, off the center tap, is calibrated to determine its exact percentage in excess or diminution of the center tap voltage.

Having obtained the wattage indication, and desiring to obtain power factor indication corresponding to that wattage, the operator, leaving all other connections as they are, immediately moves contact 109 to a point on the resistor 110 such that rotor 2 actually stops. A power factor scale 126, associated by calibration with indicator 127, is calibrated to indicate the power factor existing at the time of stoppage.

Power factor is usually lagging but occasionally is slightly leading, and in order to read power factor under leading conditions, a capacitive condenser 129′ is placed across terminals of 110.

Voltage indication

Having obtained the power and power factor, and desiring to learn the voltage at which the power is applied, the operator disconnects conductors 106 and 107, and actuates switch operator 120 to the dotted line position, for the indication of voltage.

In the dotted line positions of the switch blades, the resistance 110 is disconnected from the circuit of the potential winding 14 and inserted in the voltage supply circuit through the primary winding of current-transformer 103. In this condition, the potential winding circuit is traced from voltage terminal 118, switch arm 121, stationary contact 128, terminal 117, winding 14, and to the other voltage terminal 119. This same voltage is applied to the current transformer primary along the circuit 118, blade 121, contact 129, through the current transformer, ballast resistance 112, switch contact 130, blade 114, terminal 111, part of resistance 110, contact 109, switch blade 113, terminal 132, and terminal 119.

Figure 2:
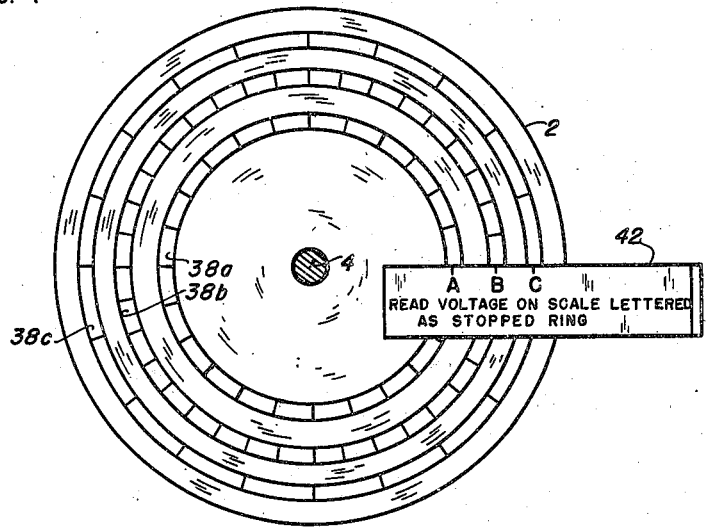
Fig. 2 is a plan view of the indicating rotor of Fig. 1.

In the connections just described the speed of disc 2 is a function of the voltage squared. The speed of the disc may be observed stroboscopically, and its significance indicated by a voltage scale 42, Fig. 2, either in connection with the concentric rings used for wattage indications, or in connection with other rings used to indicate voltage. If desired, the markings may be placed on the side of the disc opposite from that upon which the wattage rings are placed, and a suitable optical system provided wherewith to observe the same.

The variable resistance 110 provides precise adjustment whereby exact voltage (Fig. 6) may be measured. Any ring 125 may be brought to an apparent standstill through adjustment of contact 109 to include more or less of the resistance 110 for any input voltage. A particular ring 125 is selected as the one to be used for reference, and scale 131 is calibrated after the manner of the calibration of the resistance 22 of Fig. 1. The measurement of voltage after such calibration consists simply in adjusting contact 109 until ring 125 appears to stand still, and the reading of voltage from the scale 131.

In measuring watts it is desirable to insure that there is no part of resistance 110 in the circuit of winding 14. A two-position switch is desirably provided to control the entire instrument so that it is necessary to operate that switch in order to get a rotation at all, and the operation of which short circuits resistor 110.

DISTINGUISHING BETWEEN BASE SPEEDS AND MULTIPLES

It is shown that any area, say an arcuate area occupied by the number 600 in Figure 6, will appear to stand still if, in a succeeding illumination, any of its counterparts stands in the same position. For example; is area 153 at position P₁ is illuminated at time T, any of areas 154, 155, 156, etc. of identical numbering appearing at P₁ at time T plus dt, where dt is the time of darkness, will, so far as the number 600 is concerned, cause the ring to appear to stand still. In fact, any speed of the disc which is an exact multiple of the lowest speed which will cause the ring to appear to stand still, will also cause the ring to appear to stand still, the illumination being the same. However, no speed below the value for which the ring is marked will cause the ring to merely appear to stand still.

*Multiple speed distinctions by manipulation of resistance to vary torque in watthour meter motive mechanism*

Since the resistance 110 can be used to stop the rotor 2, it is a simple matter to raise the speed from zero while watching the disc. Concentric rings of progressively increasing speed or wattage significance will appear to stop and start again as this resistance is decreased, and vice versa. Thus, when contact 111 is reached, the particular ring which appears to stop for the first time indicates the electrical quantity. If it appears to stop a second time as it reaches the contact 111, the electrical quantity is double the indicated value.

One method, and the most certain, in arriving at the correct multiple of the base value, is to follow the following procedure. With contact arm 109 in the watts position, fix the vision on the ring which appears to stand still. Counting this position as one, increase the resistance 110 and count the number of times the ring appears to stop before it comes to an actual stop. Multiply the ring base value by the number of such appearances of stoppage to give the correct value of wattage.

*Multiple speed distinctions by identified groups of base speed identifying arcs*

In order to directly determine which of a limited number of multiples, as three, are involved, the basic arcs 153, etc., are grouped in groups-of-two, and groups-of-three. The groups-of-two, for example areas 153, and 154, are identical in appearance, and are distinguished as groups-of-two by marks 149 appearing in identical relation in each group. Accordingly, if movement through an arc 153 during one darkness period indicates 600 watts, the movement through two such arcs in the same period connotes 2×600 or 1200 watts. (It is understood that the rotor speed is in direct proportion to the watts.) At 1200 watts marks 149 appear in their one position in the groups-of-two, and at 1800 and 600 watts the marks 149 appear to be in every elementary arc 153. Again at 2400 watts the groups-of-two appear distinct again. The range of positive identification is therefore limited to the even multiple.

The groups-of-three, for example including areas 153, 154, 155, are identical in appearance, and are distinguished as groups by a mark 150, or a group of marks 150, 151, 152, appearing in the same position in each group, if movement through an arc 153 occurs in one darkness period, and indicates 600 watts as before, the movement through three such arcs connotes 1800 watts.

At 600 watts, mark 150 appears to be in all areas 153, 154, 155; and if marks 151 and 152 are present, they also appear to be in all areas so that there appear to be three marks in each elementary area corresponding to marks 152, 153, 150. The same is true at 1200 watts. At 1800 watts mark 151 appears only once in a group of three, as do marks 150 and 152.

At six hundred watts mark 150 appears in all areas 153, 154; and mark 149 appears in all areas 153.

At 12 hundred watts mark 150 appears in all arcs; and mark 149 appears in alternate arcs.

At 1800 watts mark 150 appears in only one arc in three; and mark 149 appears in all arcs.

Accordingly, the first, second and third multiples are distinguishable from each other.

Figure 8:
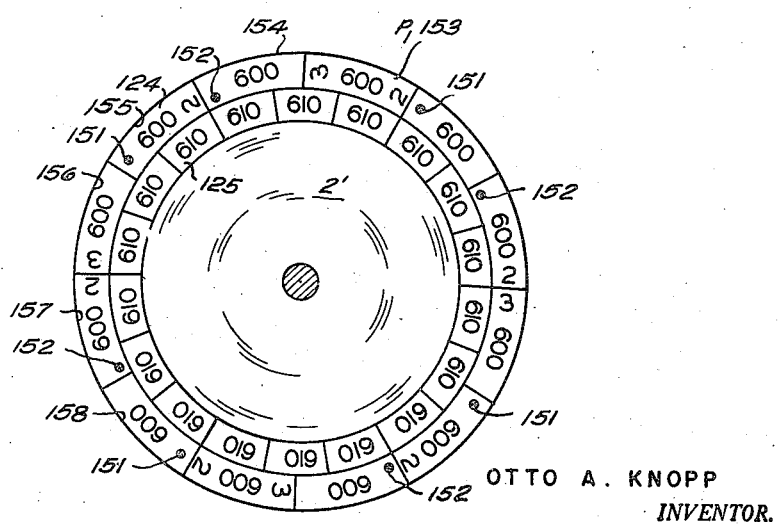
Fig. 8 is an illustration of a modification of the device of Figure 6.

The distinguishing mark 149 can be the number "2" so that when it appears in a group-of-two only, the correct multiplier is identified. In like manner the mark 150 can be the numeral "3" and its significance is manifest when it appears only once in a group of three. Accordingly, if in the observation of the disc in Figure 8, the numeral "2" appears only in alternate spaces carrying the marks 600, it is known that the speed of the disc is double the speed corresponding to the base speed and the correct value is 2×600. The numeral 2 under these conditions appears alone in a group of two markings "600." On the other hand, when the disc rotates only at its base speed, the numeral "2" appears as though it were in each space carrying the mark "600." It accordingly does not appear "visible alone in a group of two" of the first markings.

Two groups-of-three include three groups of two, so that at six times the base speed, 3600 watts, the groups-of-six will appear in correct relation, thus establishing the base ring for 3600 watts.

In similar manner, quadruple and quintuple multiples of the base speed may be distinguished and correlated with each other so that large multiples of the basic speed are readily identified over a large scale.

*Power factor recording—automatic*

Figure 7:
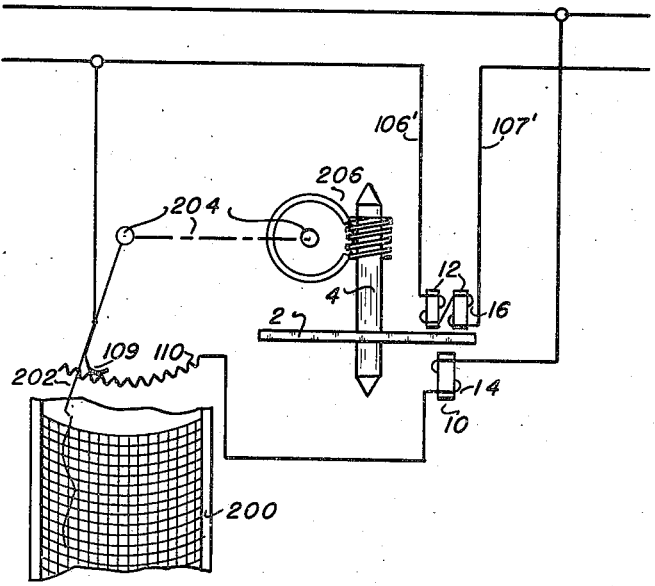
Fig. 7 is a modification of the invention as applied to the continuous indication and recording of power factor alone.

In Figure 7 the principle or variable resistance to influence the rotor 2 is illustrated to provide for recording power factor as a continuous function. Quite evidently, the recording pen arm constitutes an indicator as well as a recording medium. The watthourmeter motive mechanism drives the pen arm 202 through a conventional worm gear reduction 206 and shaft 204. Shaft 204 drives the resistance contactor 109, conveniently illustrated as fastened to the arm 202 to correlate the illustration with Fig. 3. Outside the fact that the resistor contact arm is driven by the shaft 4, rather than manually, the relationships are basically the same.

Conceiving a starting condition wherein the contact 109 completely removes resistance 110 from the circuit of coil 14, which starting condition corresponds to the watt reading position of resistor 110 in Figure 3, it is evident that the torque exerted on rotor 2 is proportional to watts, and in order to stop rotor 2 with resistance 110, it is necessary to insert sufficient of resistance 110 to bring the rotor to a stop, or to change the resistance in the circuit of coil 14 to such a value that the currents in coils 14 and 16 are in phase. If the power factor of the line is high, a large amount of such resistance is necessary. If the power factor of the line, i. e., load, is low little of such resistance is necessary to stop the rotor. If the power factor is zero for example, it is quite evident that the rotor stops because of phase coincidence of currents as between 14 and 16.

In the postulation of the position of contact 109 with resistance 110 out, in the case of Figure 7, the rotor itself exerts a torque to force contact 109 in a direction to increase the resistance in the voltage coil circuit. This increase of resistance decreases the phase angle between currents in coils 14 and 16, thus diminishing the torque. The movement continues so long as any torque is exerted, and the torque diminishes to zero when the currents in coils 14 and 16 are exactly in phase, except for frictional drag.

In short, instead of requiring the vision to determine when rotor 2 stops from a certain power condition, the rotor itself stops when there is no longer a force exerted on it, and the rotor furnishes the power to cause that condition to exist. This additional refinement renders a continuous record possible. The only time that the resistor is cut out entirely is when the power factor is zero, and the only time that the resistor is cut in fully, is at unity power factor. Therefore, the power factor scale increases in the direction of increased resistance, which is a favorable factor because power factor is usually high and a minimum of power is consumed by the voltage circuit under prevailing conditions.

It will be appreciated that the torque acting on arm 202 is very small for small changes in power factor. The watthourmeter motive mechanism is ideal here because the rotor 2 is designed especially to run counters and registers and makes a maximum use of the torque available. A very small change in power factor produces an adequate torque to effect displacement of arm 202. It is, of course, appreciated that the sensitivity of the instrument of Figure 7 can be increased by causing rotor 2 to assert a pressure on a mechanical or electrical relay which in turn causes response of resistor 110. For example, an arm on rotor 2, operating between a pair of switches in the reversing circuits of a motor driving shaft 204 would possibly be more sensitive. In this case, the sensitivity would primarily depend upon the pressure required from the rotor to close one or the other of the reversing circuits.

The watthourmeter motive mechanism of Figure 7 being of the nature of that in Figure 3, it is evident that the motive mechanism of Figure 3 can be modified to incorporate the recording feature so that a record of power factor over a period of time becomes available.

I claim:

1. In an electrical instrument, an induction rotor, magneto-motive means for driving said induction rotor at different speeds which are a proportional function of a first electrical quanity, means including the rotor for indicating the values of such electrical quantity at such different speeds through direct observation of the rotor, and means whereby the functions of the magnetomotive means are alterable at will to cause the rotor to move at other and different speeds which are a proportional function of another electrical quantity which is a factor of the first mentioned electrical quantity, and means including the rotor for indicating the values of said other electrical quantity at such other speeds.

2. A voltmeter comprising; watthourmeter motive means including voltage and current coils and a rotating disc, a first circuit including the voltage coil and terminals for application of measured voltage thereto; a second circuit including the current coil, terminals, and a voltage calibrated variable resistance in series with said circuit for application of the measured voltage to said circuit; and means on said disc for indicating the value of the voltage applied to said two circuits through direct observation of the rotating disc in stroboscopic light.

3. A voltmeter comprising: watthourmeter motive mechanism including voltage and current windings and a rotating disc; a circuit including the potential coil and means for the application of voltage thereto; a circuit including the current coil, a variable resistance, and means for the application of measured voltage thereto; means whereby a visible portion of said disc indicates the angular speed thereof; means whereby adjustment of said variable resistance modifies the angular speed of said disc and fixes the said angular speed at a definite value; and means associated with the variable resistance to indicate the value of the applied voltage influenced by the resistance adjustment to produce said fixed angular speed.

4. A single-phase alternating current wattmeter comprising: an induction type integrating watthour meter motive means including; a voltage winding, a current winding, and a disc rotor influenced by the magnetic fields produced by said windings to rotate at a speed which is a function of substantially only the product of current in the voltage winding and the current component in the current winding which is in phase quadrature with the current in the voltage winding; a series of concentric visually distinguishable rings marked on said rotor, each ring being divided into equal arcuate areas calculated to successively appear in the same space at fixed time intervals when the rotor moves at a speed corresponding to a particular value of the said product; means for rendering said areas visible at fixed time intervals corresponding to those for which said arcuate areas are calculated; a multiple ratio instrument voltage-transformer, said transformer having large ratio-variation multiplier taps to the primary coils thereof and having small-ratio multiplier taps in the secondary thereof; means for connecting one secondary terminal of the voltage transformer and any one of the small-ratio taps to said voltage winding; and means for connecting a load circuit to energize said current winding.

5. A multiple-purpose electrical instrument comprising: watthourmeter motive means including voltage and current windings and a rotor the angular speed of which is proportional, substantially, only to the product of the in-phase components of load voltage and current as applied to the instrument: means, including concentric rings with markings thereon on said rotor, adapted to visually indicate the instantaneous products of said in-phase components during rotation of said rotor: means of energization for the current winding of said motive means including; disconnecting conductors for delivering load current energization to said winding, and alternative energizing means comprising a ballast resistance; a variable resistance; switch means: and connections whereby; for one position of said switch means the variable resistance is out of the voltage coil circuit whereby the speed of the rotor is proportional to power and said variable resistance is insertable in the voltage coil circuit in amounts sufficient to distort the phase relation so that the rotor stops whereby the amount of inserted resistance is indicative of power factor, and for the other position of the switch the variable resistance is insertable in series with the load voltage energized source and the current winding to bring the speed of the rotor to a certain value, and in which said other position of the switch the voltage winding is directly connected to said voltage source without benefit of said variable resistance: said variable resistance being calibrated to indicate voltage applied when said switch is in the said other position and the speed of the rotor is at such certain value.

6. A multiple purpose instrument comprising: watthourmeter motive means including voltage and current coils and a rotor: means, including concentric rings with markings thereon on said rotor, adapted to visually indicate the instantaneous products of the in-phase components of currents in said coils during rotation of said rotor: means for energizing said current winding in proportion to a load voltage: means for energizing said voltage winding in proportion to such load voltage: means for energizing said current winding in proportion to load current, and means alternatively insertable in the energizing circuit of the voltage winding for indicating power factor by stopping the rotor and insertable in the voltage energizing circuit of said current winding for indicating, in conjunction with a certain speed of said rotor, the value of applied voltage.

7. A multiple purpose electrical instrument comprising: watthourmeter motive means including voltage and current windings and a rotor the angular speed of which is proportional, substantially, only to the product of the in-phase components of load voltage and current as applied to the instrument: means, including concentric rings with markings thereon on said rotor, adapted to visually indicate certain values of the instantaneous products of said in-phase components during rotation of said rotor: means, including a multiple-ratio instrument current transformer, connected for energization of the current winding; means, including a multiple ratio voltage transformer having percentage taps for each ratio, for energizing the instrument in accordance with, or at fractions of a percent difference from, the voltage of the measured circuit; a ballast resistance; a variable resistance including a zero value: means for putting said voltage winding under series control of said variable resistance and in series with the voltage output of said multiple ratio voltage transformer, means for insuring deenergization of said current winding from said voltage transformer while said current transformer is energized by a current supply; a calibrated scale associated with said variable resistance to indicate power factor when the value of the resistance is such as to produce zero rotation of said rotor; and means to supply load current of the measured circuit to said instrument current transformer—whereby in the zero position of said variable resistance said visual indicating means indicates the product of two electrical quantities and whereby said variable resistance may be positioned to stop the rotor whereby to indicate power factor on said power factor scale: and means for putting said ballast resistance and said current transformer under series control of said variable resistance and in series with the output of said multiple ratio voltage transformer and putting said voltage winding directly in series with said voltage output and removing said variable resistance from said voltage coil circuit for voltage measurement; means for disconnecting said load current supply means; and a scale associated with said variable resistance calibrated to indicate the voltage when the rotor rotates at a fixed speed.

8. In an electrical instrument; watthourmeter motive means including voltage and current coils and a rotor the angular speed of which is proportional, substantially, only to the product of the in-phase components of load voltage and current as applied to the instrument; a resistance having one connection to one terminal of the voltage coil, a contact arm having a contact in cooperative relation with said resistance to vary the same in movement of the contact over the resistance and connected to complete the circuit of the voltage coil through the resistance to the instrument terminal normally associated with the said one terminal of the voltage coil, and means connecting the rotor to the contact arm to cause the contact arm to move in a direction to increase or decrease the effective resistance in the voltage winding circuit sufficiently to cause stoppage of the contact arm and rotor concurrently at any phase relation existing between the voltages applied to the two windings and the resistance, said resistance being so chosen that the range of phase relations of currents in the coils produced thereby includes the in-phase relation corresponding to zero torque produced by said coils on said rotor.

9. An electrical indicating instrument of the alternating current class including a rotating element adapted to rotate at speeds in proportion to the value of an electrical quantity, stroboscopic means including several visible rings for indicating several fixed values of the electrical quantity effecting rotation of the rotating element; and means, including a ratio transformer having very small increments of ratio change, connected for response to the quantity to cause the element to rotate at speeds equal to a speed corresponding to one of said fixed values when the quantity value is between two of the fixed values, so that the known value of the increment in ratio change indicates the variation of the between value from one of the fixed values.

10. An electrical quantity indicating instrument comprising a rotary motor responsive to the electrical quantity to be indicated so as to produce rotor rotational speed in proportion to the value of the quantity, and stroboscopic means associated with the rotor for indicating a fixed value of the quantity producing the rotational speed wherein the motor includes one induction coil, a second induction coil, and an induction rotor; one of said coils being designed to permit flow of current therethrough in phase quadrature with the voltage applied thereto and the other of said coils being designed to permit flow of current therethrough substantially in phase with the voltage applied thereto; and a calibrated resistance in series with said other coil adjustable to produce a fixed speed of rotation of said rotor as indicated by said stroboscopic means, the calibration of said resistance characterising the applied voltage.

11. An alternating current type indicating instrument comprising a motor responsive to the alternating current quantity to be indicated so as to produce rotor rotational speed in proportion to the value of the quantity, and stroboscopic means associated with said rotor for indicating several fixed values of the electrical quantity to be indicated, and means comprising a continuously variable resistance connected in circuit between the source experiencing the quantity and the device for causing the indicating means to indicate various values of a different quantity of the electrical circuit.

12. In an electrical measuring instrument of the alternating current type, an induction rotor, two sets of coils designed and related to the rotor so as to, when receiving currents therethrough, produce rotation of said rotor at speeds in proportion to the products of the currents flowing through the coils, means for applying the same voltage to both of said coils, and a resistance of variable character adapted to be inserted in series with one of said coils so as to reduce the voltage applied to that coil only whereby to vary the speed of the rotor in proportion to the amount of such resistance inserted, means to indicate when the rotor rotates at a known speed, and means associated with the resistance for indicating the value of the voltage applied to the two coils.

13. In an electrical measuring instrument of the alternating current type, an induction rotor, a coil for producing eddy currents in said rotor, a coil for producing a magnetic field in phase with the eddy currents of said rotor adapted to react with the currents to produce rotation of said rotor, means for producing the phase quadrature relation of said field and said eddy currents associated with one of said coils, a resistance in series with the other of said coils, means for varying said resistance, means for indicating a fixed speed of said rotor, means for applying the same voltage to the coil and series resistance in series and the other coil in parallel therewith, and means for indicating the value of the voltage associated with said resistance varying means adapted to indicate the value of the voltage when the rotor moves at the fixed speed.

14. In an electrical instrument of the alternating current type having a rotor adapted to rotate under the influence of electromagnetic fields produced by two sets of coils at speeds in proportion to the products of the currents producing said fields, means for indicating a fixed speed of said rotor, means for varying the current through one of said coils comprising a resistance and a variable contactor therefor, said resistance and said coil being so related that the variation of resistance does not change the phase angle between the voltage applied thereto and the current flowing through said resistance and coil, a pair of instrument terminals, means connecting said one of said coils and said variable resistance between said terminals, means connecting said other coil to said terminals, and means connected to said variable contactor for indicating the voltage when the resistance is adjusted to a value such that the rotor rotates at the fixed speed.

15. In combination, watthourmeter motive means, means whereby said watthourmeter motive means is adapted to indicate power of a circuit, and means whereby said watthourmeter motive means is adapted to indicate the voltage of said circuit, said last named means including an adjustable voltage-calibrated resistance, a scale, and a pointer, and means for connecting the resistance in the current supply of said motive means.

16. The combination of claim 15 with means including a power factor scale adjacent the pointer for indicating power factor.

17. An electrical indicating instrument comprising a rotor and magnetomotive means cooperating with said rotor to produce rotation of said rotor at a speed which is proportional to the square of an electrical potential applied to the instrument, means including the rotor for indicating the value of the potential when the potential is applied to the instrument, and comprising means including an impedance continuously adjustable in magnitude without changing the phase of current passing therethrough connectable in series with one of the coils of said magnetomotive means adapted to cause said rotor to run at a fixed speed for different values of said potential.

18. An electrical indicating instrument comprising a rotor and magnetomotive means cooperating with said rotor to produce rotation of said rotor at different speeds which are proportional to the squares of the corresponding electrical potentials applied to the instrument, means dependent on the speeds of the rotor for indicating various fixed rotor speeds, means for adjusting the rotor speeds, and means including a scale, and a pointer connected to the adjusting means for indicating the value of the potential when the rotor rotates at such speeds.

19. An electrical indicating instrument comprising a rotor and magnetomotive means cooperating with said rotor to produce rotation of said rotor at a speed which is a function of an electrical quantity applied to the instrument, means dependent on the speeds of said rotor for indicating when said rotor rotates at various fixed speeds, and means connected in the circuit supplying the magnetomotive means for adjusting the speeds to the fixed values and means connected to the adjusting means for indicating the values of the quantity at those speeds.

20. In an electrical instrument, an induction rotor, magnetomotive means for driving said rotor at a speed which is a function of watts, means for connecting said magnetmotive means to a circuit to effect such drive, means for indicating the value of watts in the circuit so connected including said rotor; means whereby the functions of said magnetomotive means are alterable at will to cause the rotor to move at speeds which are a function of volts, means including the rotor for indicating voltage, means for connecting said magnetomotive means to a circuit for indicating the voltage of the circuit; means whereby the functions of said magnetomotive means are alterable at will to cause the rotor to stop when connected to indicate watts, and means for indicating power factor as a result of operating said means to cause the rotor to stop.

21. In an electrical instrument, an induction rotor, magnetomotive means for driving said rotor at a speed which is a function of volts, means for connecting said magnetomotive means to a circuit to effect such drive, means including said rotor for indicating the value of the volts in a circuit when so connected, means whereby the functions of said magnetomotive means are alterable at will to cause the rotor to stop as an indication of power factor, and means for indicating power factor as a result of operating the said means to cause the rotor to stop.

22. An alternating current type indicating instrument comprising: a motor responsive to the alternating current quantity to be indicated so as to produce rotor rotational speed in proportion to the value of the quantity, and means comprising a continuously variable impedance connected in circuit between the source experiencing the quantity and the motor for changing the speed of the motor; and an indicator and a scale correlated with the variable impedance to indicate the value of the electrical quantity in conjunction with a particular value of the speed of the rotor.

23. An alternating current type indicating instrument comprising a motor responsive to the alternating current quantity to be indicated so as to produce rotor rotational speed in proportion to the value of the quantity, stroboscopic means associated with said rotor for indicating several fixed values of the electrical quantity to be indicated, and means comprising a continuously variable impedance connected in circuit between the source experiencing the quantity and the device for causing the indicating means to indicate various values of a different quantity of the electrical circuit.

24. In combination, a motor having an induction rotor, a winding magnetically associated with said rotor to produce a magnetic flux interlinking with elements of said rotor for producing eddy currents in said rotor, a source of alternating current voltage for connection to said winding, the magnetic circuit associated with said winding being so designed that the current which flows therethrough has a substantial time-phase displacement with respect to the voltage of the alternating source applied to the winding; a second winding associated with said rotor to produce a magnetic flux interlinking with elements of said rotor for producing eddy currents in said rotor, a source of alternating current voltage for said second winding, the magnetic circuit of said second winding being so designed that the current which flows therethrough has substantially no time-phase displacement with respect to the voltage applied to said second winding; whereby when the alternating current voltages applied to the two windings are in phase a substantial driving torque is applied to said rotor and whereby when the said voltages are separated in time phase by substantial time the driving torque is reduced, means for connecting said respective windings for energization from said sources of voltage, a variable resistance, and means for connecting said variable resistance in series with either winding and its source of voltage, whereby when connected in series with the first winding the phase relation between the voltage of the source and the current through the first winding is variable by said resistance and whereby when connected in series with the second winding the phase relation between the voltage of the source and the current through the second winding is fixed and the effective current therethrough is variable; so that when the resistance is connected in series with the first winding the torque on said rotor may be varied from a maximum value to a zero value, and when the resistance is connected in series with the second winding the torque on the rotor may be varied without affecting the power factor of the power applied to the motor.

25. In combination in an electrical motor, a rotor, magnetomotive means associated with said rotor having distinct magnetomotive circuits one of which is largely reactive and the other of which is largely non-reactive whereby a torque is developed in said rotor, a continuously variable impedance, and means for connecting said impedance in circuit with any one of said magnetomotive circuits, whereby when in circuit with one of them the effective phase angle thereof is variable and whereby when in circuit with the other the total impedance thereof is variable.

26. An electrical instrument comprising: watthour meter motive means including voltage and current windings and a rotor the movement of which is proportional to the product of the quadrature related components of currents passing through said windings, and a variable resistance in the circuit of one of said windings, said variable resistance including values of resistance capable of causing the said quadrature components of currents in the two windings to occur substantially in phase, whereby upon including such values of resistance, the rotor stops rotating, and whereby the values of such resistance indicate the value of power factor determined by the currents applied to the windings, and means connecting said rotor to said variable resistor to cause the resistor to be proportionately included in the circuit in amount sufficient to cause the rotor to stop.

27. In combination, an electric motor including a rotor and magneto-motive means for causing rotation of said rotor in response to application of electrical power thereto, said magneto-motive means consisting of a pair of magneto-motive coils the respective impedances of which are such as to cause the magneto-motive effects thereof to occur out of time-phase whereby to produce rotation of the rotor in proportion to the degree of time-phase disparity; and a variable impedance of sufficient value in circuit with one of the magneto-motive coils and adjustable so as to so change the time-phase relation of currents in said coils that the rotor comes to a stop when the voltages applied to the coil circuits are in phase, said rotor being connected to drive the variable impedance to a position for stopping the rotor.

28. A stroboscopic indicating member having a series of equally spaced identical numerical markings thereon representing the base speed at which said markings appear to be stationary and designed to appear to stand still in stroboscopic or intermittent light when moving at said base speed or an integral multiple thereof, and a separate numerical marking in the same position in each group of a series of equal groups of said first markings representing the number of markings in each group, said separate numerical markings signifying, when only one marking appears in each group, the number by which the base speed is to be multiplied to give the true value of speed.

29. A stroboscopic indicating member having a series of equally spaced identical markings thereon representing the base speed at which said markings appear to be stationary and designed to appear to stand still in stroboscopic or intermittent light when moving at said base speed or an integral multiple thereof, and a separate marking in the same position in each group of a series of equal groups of said first markings representing the number of markings in each group, said separate markings signifying, when only one marking appears in each group, the number by which the base speed is to be multiplied to give the true value of speed.

OTTO A. KNOPP.